June 5, 1951
T. W. ZOBEL
2,555,387
INTERFERENCE DEVICE FOR EVALUATING INTERFERENCE PHENOMENA OVER LARGE REGIONS
Filed May 19, 1947
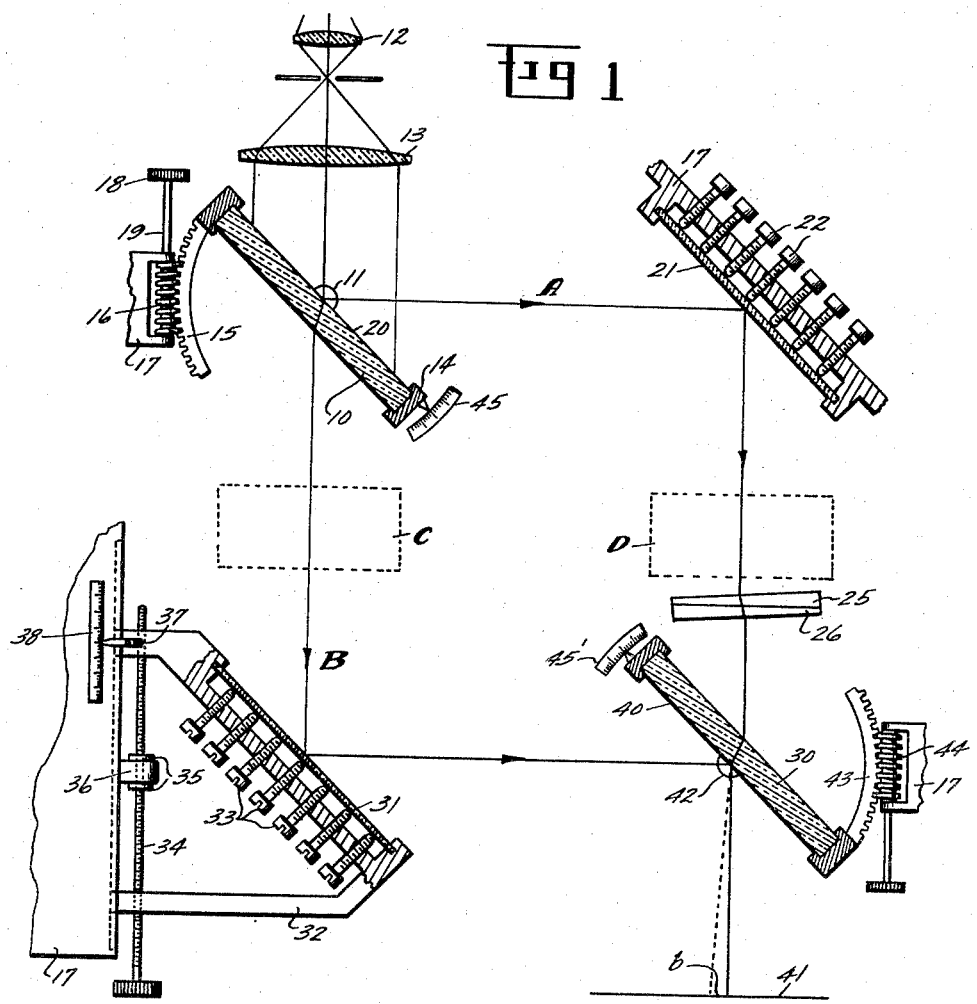
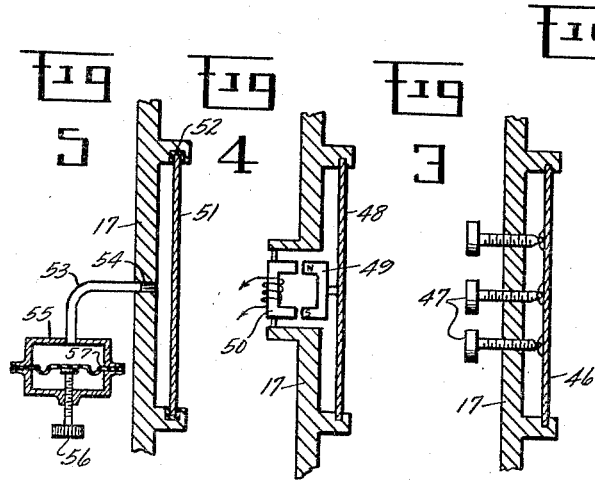
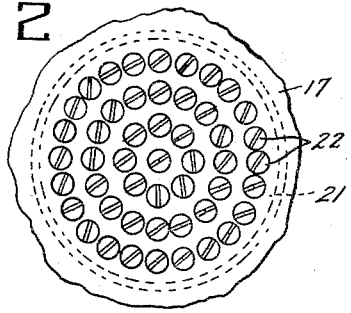
INVENTOR.
THEODOR WILHELM ZOBEL
BY Wade Koonts
ATTORNEY
H. H. Losche
AGENT Patented June 5, 1951

2,555,387

UNITED STATES PATENT OFFICE 2,555,387

INTERFERENCE DEVICE FOR EVALUATING INTERFERENCE PHENOMENA OVER A LARGE REGION

Theodor Wilhelm Zobel, Braunschweig-Lehndorf, Germany

Application May 19, 1947, Serial No. 749,071

7 Claims. (Cl. 88—14)

(Granted under the act of March 3, 1883, as amended April 30, 1928; 370 O. G. 757)

The invention described in the foregoing specification and claims may be manufactured and used by or for the Government for governmental purposes, without the payment to me of any royalty thereon.

This invention relates to interferometric devices capable of adjustably compensating for optical flatness and prismatic errors of the optical components therein, or of optical errors introduced by the passage of a split beam thereof through a test section.

Interferometric devices belong to that group of measuring instruments which require maximum accuracy of all optical components. Such instruments are extremely sensitive to all disturbances, such as the influence of vibrations and temperature, and dimensional changes of the apparatus itself, and must therefore be provided with very exact means of adjustment. These devices are capable of utilizing the wave characteristics of light to produce various types of interference phenomena, which are in many cases applicable to physical and technical measuring procedures requiring utmost accuracy.

It is well known that up to now it has been possible to produce good interference phenomena only by the use of optical components of highest accuracy and quality, the degree of plane-parallelism and flatness of plates and mirrors being equivalent to that required for astronomical instruments. The requirements have up to now limited the general use of this equipment because of the extreme cost of such articles, and because it is very difficult, if not impossible, to produce exactly plane-parallel plates of large size.

In the present invention the use of glass plates whose surfaces are exactly parallel is no longer an essential requirement for producing interference fields of excellent quality. It is only necessary that the surfaces of all interferometer plates and mirrors be optically flat. The fabrication of optical flats is a comparatively simple matter, even in large sizes, since glass is a material possessing such characteristics that a smooth and optically flat surface is easily produced. Since it is only the requirement for exact parallelism of both surfaces that introduces the great monetary and time considerations, the elimination of this requirement is of great significance in making this equipment generally available to research. Furthermore, in practicing the present invention, the surfaces of the splitting plates of the four plate interference apparatus may not only include a slight wedge angle, but may be awry to each other. Under these conditions the plates produce a prism effect, which is merely equivalent to introducing a slight bending of the light beam. If the surfaces of the plates are optically flat, the bending will be uniform throughout the cross section of the beam. By proper angular adjustment of the plates and mirrors, all such prismatic effects may be fully compensated, and all coherent pairs of rays brought together on the last plate. If the wedge angle were very large, it would be possible that interference bands could only be produced with monochromatic light since a large angle might introduce such a difference in the length of light paths of the split beams that coherent conditions would be exceeded. Where such changes in the light paths are relatively large as a result of one of the light beams passing through a test section in which there are windows, this invention includes compensating means for such large deviations by using two rotatively adjustable wedge shaped optical plates in the path of the beam which does not pass through the test region. Where the optical flats have assumed a slight convex or concave contour due to their position or their own weight they may be adjusted to optical flatness or their optical flatness may be compensated for in the practice of the present invention.

It is a primary object of this invention to provide an interferometric device capable of using optical components of any desired size.

It is another object of this invention to provide an interferometric device for observing light interference phenomena over a large test region.

A further object of this invention is to provide a means to adjustably compensate for errors in optical flatness of the optical components in the interferometer system, and to adjustably compensate for prismatic errors of auxiliary plates introduced by a test region.

A still further object of this invention is to provide an interferometric device having two optically flat mirrors arranged on opposite corners of a parallelogram with two angularly adjustable optically flat optical plates such that all the optical components are angularly disposed to an incident light beam but substantially in parallel relation with one mirror being adjustable along one side of the parallelogram, and a rotatable diasporameter means arranged between one of the mirrors and one of the optical plates adapted to adjustably compensate for light deviations in the optical system, the flatness errors of the optical components of the system being compensated by a surface adjusting means on at least one of the mirrors.

These and other objects and advantages will become apparent as the description proceeds, taken in conjunction with the following drawing, in which:

Fig. 1 is a diagrammatic plan view of the interferometer device with parts shown in section;

Fig. 2 is a back elevational view of the mirror surface adjusting means shown in Fig. 1;

Fig. 3 is a modified mirror surface mechanical adjusting means with part of the framework structure being broken away;

Fig. 4 is a cross-sectional view of a modification of a mirror surface electrical adjusting means with part of the framework structure broken away; and Fig. 5 is a cross-sectional view of a modification of a mirror surface fluid pressure adjusting means with part of the framework structure broken away.

Referring particularly to Figs. 1 and 2, there is shown an optical splitting glass plate 10 that is rotatable about opposite pivots 11 preferably within a few degrees range about an angle of 45 degrees from parallel paths of a light ray source provided by the condenser lenses 12 and 13. The glass plate 10 is retained in a frame 14, which includes one of the cooperating parts of the pivots 11, and has a sector of a ring gear 15 extending laterally outwardly from the frame 14 about the pivots 11 as a center of rotation. A worm gear 16, cooperative with the sector ring gear 15, is journaled in a portion of an interferometer framework 17 and has knurled knob 18 connected to it by a shaft 19 for manual rotation of the worm gear 16 to effect manual angular adjustment of the glass plate 10.

The front surface 20 of the glass plate 10 is partially coated so that a part of an incident light beam is reflected, while the other part is transmitted through the plate. The reflected light beam, hereinafter referred to as light beam A, is reflected on a glass front-faced mirror 21 which is substantially parallel to the plate 10. Mirror 21 is mounted at its periphery in a part of the interferometer framework 17, a portion of which extends behind the mirror and supports a multiple of manually adjustable screws 22 screw threaded through the framework. The screws may be selectively adjusted to deform the mirror wherein slightly concave portions may be made optically flat, or the mirrored surface made slightly convex to compensate for optical flatness errors in other optical components of the interferometer optical system.

The light beam A reflected on the mirrored surface 21 is directed through a pair of identical optical plates 25 and 26, which comprises a rotatable diasporameter, to a second optical glass plate 30. The wedge plates 25 and 26 are mounted on the interferometer framework (not shown) with their engaging surfaces lying perpendicular to the incident light ray path such that each may be rotated with respect to the other, and also that both may be rotated together. By adjustment of the diasporameter means in the above described manner the light beam A may be deviated through any desirable small angle.

The refracted light beam transmitted through the plate 10, hereinafter referred to as light beam B, is reflected on a second front-faced mirror 31 which is substantially parallel to the mirror 21. The mirror 31 is mounted in a bracket 32 having a wall behind the mirror through which a multiple of manually adjustable screws 33 are threaded in the same manner and for the same purpose as the screws 22 for the mirror 21. The bracket 32 is slidable along a surface of the interferometer framework 17, preferably in tracks as is well known in the art, by a manually adjustable screw 34 held against longitudinal displacement by enlarged portions 35 thereon disposed on opposite sides of a lug 36 on the interferometer framework 17. The bracket 32 has a pointer 37 in cooperative relation with a scale 38 for indicating the position of the mirror with respect to the remaining components of the optical system. By rotation of the shaft 34 exact final adjustment of the interferometer may be made such as for seeking the position of zero light interference.

The light beam B reflected on the mirror 31 is directed to the plate 30 where it may be made to rejoin the light beam A emerging as a refracted beam. The plate 30 has a surface 40 partially coated to reflect the light beam B in the direction of the light beam A, or as a single emergent beam with A. The light beams A and B are directed to the interference field 41 which may be in the nature of a telescope, screen, photographic film, or scale from any of which readings may be derived.

The plate 30 is arranged substantially parallel to the plate 10, and mirrors 21 and 31 but it is mounted adjustable about pivots 42 by manually adjustable sector gear and worm gear connection 43, 44 in the same manner as the plate 10 such that an angular difference may be provided between plates 10 and 30 which may be calibrated on angular scales 45 and 45'. However, by the present invention, the plates 10 and 30 may be slightly awry to each other due to inaccurate assembly, or the plates may be slightly wedge shaped through inaccurate fabrication. Under these conditions the plates produce a prism effect which is merely equivalent to introducing a slight bending of the light beam. If the surfaces of the plates 10 and 30 are optically flat, however, the bending will be uniform throughout the cross section of the beam. By proper angular adjustment of the plates and mirrors about their own axis all such prismatic effect may be fully compensated and all coherent rays be brought together on plate 30. Where these wedge angles become very large, as where the beam B is made to pass through a test region, shown in dotted lines at C, which includes auxiliary plates, it becomes necessary to compensate for the relatively large changes in optical lengths of the light paths through the auxiliary plates by adjusting the wedge plates 25 and 26. The adjustment of the wedge plates 25 and 26 relative to one another, or as a unit, provides a wide range of compensating adjustments in the wedge angle and direction of wedge. The total wedge angle of both plates together is adjustable from zero to a maximum equal to the sum of the wedge angles of the individual plates. By suitable choice of the angular positions of these wedge plates 25 and 26 with respect to each other, full compensation for a difference in wedge angle and glass thickness of the auxiliary glass plates may be achieved.

It may be seen from the foregoing description and the drawing that the two plates and the two mirrors are in a parallelogram arrangement in which the mirrors and plates occupy opposite corners and are all substantially, but not necessarily, parallel to each other and at approximately 45 degree angles with respect to a side of the parallelogram. When all the plates and mirrors are adjusted so that their surfaces are exactly parallel, an interference band of infinite width, so called "Middle Figure" band, may be observed. With parallel plates and beams consisting of bundles of exactly parallel rays the intersection or interference occurs at infinity. The form of the "Middle Figure" observable by adjusting the screws 22 and 33 is a criterion for the quality of the optical surfaces producing the interference effects.

The band width, $$b = \frac{\lambda}{\sin \alpha}$$

is a function of the wave length of the light used and of the sine of the angular difference, $a$, existing between two optical parts e. g., the plates 10 and 30. The width of the bands decrease as this angle becomes larger. The smallest band width would theoretically approach the wave length of the light used as the angle was increased to 90 degrees. Conversely, the band width becomes infinitely large as the angle approaches zero degrees. This extreme case of obtaining the smallest band width of adjusting the angle $\alpha$ to approach 90 degrees is, of course, only theoretically possible. The condition when the angle is zero signifies only that all light paths coming out from the plates and mirrors are exactly parallel and that the beam emerging from plate 30 consists of a light bundle of exactly parallel rays. A slight angular adjustment, for example of the plate 30 in the clockwise direction, would reflect light beam B as shown in dotted lines while light beam A would remain substantially unchanged.

In practice, even when using plates and mirrors of highest quality in most exact adjustment, the zero interference band obtained with parallel light paths usually assumes a circular surface (hence "Middle Figure" band) instead of producing a field of uniform lightness or darkness. This indicates that even such high quality surfaces are slightly convex or concave which may be caused in part by slight bending due to their own weight such as in the case when they are installed at 45 degree angles when the interferometer is used in a vertical plane. In order to produce a "Middle Figure" of excellent quality the adjusting screws 22 and 33 may be manipulated to flatten the corresponding reflecting surface or to introduce a slight amount of convexity to compensate for the optical flatness errors of the mirrors and plates. In the particular application shown in Fig. 1, a deformation in only one direction on the mirrors 21 and 31 cause opposite compensating effects on the interference picture due to the location and orientation of the mirrors with respect to the light path.

As shown in Figs. 3, 4, and 5, the deformation of the mirrors may be carried out in various ways which, as illustrated, may be mechanically, electrically, or by fluid pressure. As illustrated in Fig. 3, a multiple of screws 47 threaded in the framework 17 have swivelled connections with the back surface of a metal mirror 46 to provide deformation of the mirror surface in both directions. This principle could also be accomplished by rigidly cementing an optical surface fabricated from a non-crystalline material to a metal backing plate and having the metal backing plate operatively connected to the adjusting screw as described above. It would be necessary to have only one mirror adjustable in this manner in the interferometer device since compensating effects can be produced in either direction.

Fig. 4 shows a mirror 48 with a metal backing plate, as shown in Fig. 3, that has a small permanent magnet 49 attached centrally thereof, as shown. The framework 17 has an opening centrally behind the mirror in which is mounted an electromagnet 50 with pole pieces in close relation with the pole ends of the permanent magnet 49. By selectively directing D. C. current through the coil of the electromagnet the permanent magnet will be attracted or repelled to deform the mirror to concavity or convexity, and the rate of current flow through the electromagnet coil will determine the force exerted on the mirror.

Another manner of deforming the mirror is shown in Fig. 5 in which a mirror 51 has its periphery sealed in a chambered portion of the framework 17 by a sealing means 52. A fluid conduit 53 connects the chamber behind the mirror through an opening 54 in the back wall of the interferometer framework 17 to a manually adjustable diaphragm operated pressure regulating means 55. The rotation of a screw 56 swivelably connected centrally to the diaphragm 57 is operative to force the mirror to a convex contour or to draw the mirror to a concave contour.

While the means for deforming the mirrors have been shown as manually adjustable it may be well understood that these adjustments may be effected by the mere application of power motor means where such is desirable.

Where the above described device is used to observe and measure interference in a test section, as indicated at C, which introduces optical errors due to pressure and vacuum on the test section window plates, a chamber D should be constructed having the same span in which the pressure conditions of the test section C can be simulated. If the test section C is situated in the light beam B, as shown in Fig. 1, the simulated chamber D must be placed in the light beam A to provide compensating effects. The bulging or collapsing of both sets of window plates in the test section C and the chamber D due to pressure or vacuum conditions gives a partial compensation but due to the difference in bending qualities of glass plates additional compensation is necessary by adjusting screws 22 or 33 on the mirrors. The wedge angles introduced in the split interference beams may be compensated by adjustment of the diasporameter means 25, 26.

The present invention makes it possible to observe light interference over a large test region since large size optical components may be used. By providing such a device it is possible to perform absolute density measurements and the adjustments for zero interference is not altered by changing conditions, such as velocity, for example, in the test region.

It is to be understood that various modifications and changes may be made without departing from the spirit and scope of my invention and I desire to be limited only within the scope of the appended claims.

I claim:

1. In an interferometer apparatus having a light source; means for producing a beam of light rays from said light source; a beam splitter plate inclined across the beam for splitting the beam to produce two relatively diverging partial beams of light rays, one of which traverses a test section; one partial beam passing through the splitter plate and the other reflected by the splitter plate to form the diverging partial beam; a full mirror positioned in the path of each of the diverging partial light beams for reflecting the two diverging beams across each other at equal optical distances from the beam splitter plate; a second beam splitter plate positioned in the path of the partial beams at their point of intersection for recombining the partial beams to form the interference beam; rigid supporting frame means engaging and rigidly supporting one of the full mirrors around its periphery; and adjustable means carried by said frame means for actuating cooperation with said one of the full mirrors at the back thereof, intermediate its periphery, for adjusting the contour of the reflecting surface thereof intermediate its periphery relative to the contour of the reflecting surface of the other full mirror to bring the light rays in one of the partial beams, reflected by one of the full mirrors, into parallel relation in the interference beam with the combined rays of the other partial beam reflected by the other full mirror to produce an improved interference pattern.

2. Apparatus as claimed in claim 1, in which both of the full mirrors are mounted in rigid frames and supported around their peripheries, and individual adjusting means are carried by both of the frames, engaging both of the full mirrors at the backs thereof intermediate their peripheries for adjusting both of the reflecting surfaces of the mirrors intermediate their peripheries to adjust the direction of the respective parallel rays reflected by the reflecting surfaces of the full mirrors into parallel relation to each other in the interference beam to produce an improved interference pattern.

3. Apparatus as claimed in claim 1 in which the full mirrors are supported at their peripheral edges and said adjusting means comprises a plurality of adjustable compression members carried by the frame, in spaced relation to each other in back of predetermined spaced reflecting areas of the full mirror, and the adjustable compression members are disposed in juxtaposed actuating relation with the back surface of the full mirror, for adjusting the reflecting surface thereof in one of the areas relative to the position of the reflecting surface in an adjacent area, whereby the rays in the partial beam reflected by the full mirror in the said areas and the rays in the other partial beam reflected by the other full mirror and combined by the second beam splitter plate to form the interference beam are adjusted into parallelism in the interference beam to produce an improved interference pattern.

4. Apparatus as claimed in claim 1 wherein the frame which supports the full mirror is provided with a plurality of threaded openings located in the back of that mirror extending toward the back of that mirror in a plurality of spaced areas uniformly distributed over the back of that full mirror; and the adjusting means comprising individual adjustment screws threaded in said openings with their innner ends movable into adjusting engagement with the back of that mirror in said areas, and includes means on their outer ends for rotative adjustment of the screws.

5. In a four plate interferometer apparatus; a light source; means for producing an enlarged beam of parallel rays from said light source; a beam splitter plate inclined across the beam for splitting the beam to produce two relatively diverging partial beams of parallel rays, one of which traverses a test section, one partial beam passing through the splitter plate, and the other reflected by the splitter plate to form the diverging partial beam; a full mirror inclined across each of the diverging partial light beams for reflecting the two diverging partial beams across each other in intersecting relation at equal optical distances from the beam splitter plate; a second beam splitter plate inclined across the partial beams at their point of intersection for recombining the partial beams to form the interference beam; a rigid supporting frame for each of the full mirrors having an annular supporting flange surrounding and rigidly supporting each of the mirrors at their peripheries; and adjusting means carried by at least one of the frames and movable into actuating engagement with the back of the full mirror supported by that frame, intermediate its periphery, comprising adjusting screws; threaded opening formed in the frame intermediate its annular supporting flange, threadably receiving said adjusting screws; and a swivel connection between the adjusting screws and the back of that mirror for adjusting the contour of the reflecting surface of that mirror intermediate its periphery to bring the parallel rays of the partial beam reflected by that mirror into parallel relation, in the interference beam, with the parallel rays of the other partial beam in the combined interference beam and reflected by the other full mirror to improve the interference pattern in the interference beam.

6. In an interferometer device as claimed in claim 1, wherein the actuating means for adjusting the reflecting surface of at least one of the full mirrors comprises a permanent magnet and an electromagnet operatively coupling the back surface of the mirror to the frame by a variable flux gap, which magnet may be energized to attract or repel by a force determined by the direction and magnitude of current flow through the electromagnet to adjust the reflecting surface thereof intermediate its periphery in either direction to improve the interference pattern in the interference beam.

7. In an interferometer of the four-plate basic system type having a light source, means for collimating light from said source to form an initial collimated light beam, a beam splitter plate inclined across the collimated beam having a partially transparent reflecting surface for splitting the beam to produce two diverging partial light beams constituting measuring and comparison beams, one beam passing through the plate and the other reflected by the plate, a full mirror inclined across each of said partial beams to reflect the beams across each other at equal optical distances from the splitter plate reflecting surface; a second beam splitter plate having a partially transparent reflecting surface inclined across said partial beams at their point of intersection to combine the beams, one beam passing through the last mentioned plate and its reflecting surface and the other beam reflected by the last mentioned reflecting surface in combined parallel relation to form the interference beam, supporting means for at least one of said full mirrors comprising a rigid mirror frame extending across the full mirror in spaced relation at the back thereof having forwardly extending mirror supporting flange means engaging and rigidly supporting the full mirror around its peripheral edge, and a plurality of individually adjustable screws adjustably carried by the frame in rear of predetermined areas of the full mirror, in inwardly spaced relation to its peripheral edge, said adjustable screws having their inner ends disposed in cooperative actuating engagement with the back of the full mirror inwardly of its peripheral edge and adjustable in the frame perpendicular to the mirror for adjusting the reflecting surface of the full mirror in said areas relative to similar areas of the other full mirror reflecting surface while rigidly supporting the mirror at its peripheral edges to prevent bodily movement of the mirror in the interferometer, whereby the surface contour of one of the full mirrors of the interferometer is adjustable relative to the surface contours of the other full mirror and splitter plates, to adjust the direction of the rays of one of the partial beams in the interference beam relative to the rays in the other partial beam, to improve the parallel relation of the rays in the interference beam.

THEODOR WILHELM ZOBEL.

REFERENCES CITED

The following references are of record in the file of this patent:

UNITED STATES PATENTS

| Number | Name | Date |
|---|---|---|
| 504,890 | Ohmart | Sept. 12, 1893 |
| 908,725 | Ashley | Jan. 5, 1909 |
| 1,306,320 | Twyman | June 10, 1919 |
| 1,709,762 | Zworykin | Apr. 6, 1929 |
| 1,890,166 | Shatto et al. | Dec. 6, 1932 |
| 2,081,299 | Hill | May 25, 1937 |
| 2,256,855 | Zobel | Sept. 23, 1941 |
| 2,418,786 | Nadig et al. | Apr. 8, 1947 |

FOREIGN PATENTS

| Number | Country | Date |
|---|---|---|
| 499,545 | Germany | June 10, 1930 |
| 577,377 | Germany | July 12, 1933 |

OTHER REFERENCES

Journal Optical Society of America, article by D. Sinclair, on pages 511 to 513 of volume 30, 1940.

Fundamentals of Optical Engineering, D. H. Jacobs, first edition, published by McGraw-Hill Book Co. Inc., New York, New York, 1943, pages 267, 268.